US012016344B2

(12) United States Patent
Blaine

(10) Patent No.: US 12,016,344 B2
(45) Date of Patent: Jun. 25, 2024

(54) TRIMMING WORK PRODUCTS TO OPTIMIZE PRESSING

(71) Applicant: John Bean Technologies Corporation, Chicago, IL (US)

(72) Inventor: George R. Blaine, Lake Stevens, WA (US)

(73) Assignee: JOHN BEAN TECHNOLOGIES CORPORATION, Chicago, IL (US)

( * ) Notice: Subject to any disclaimer, the term of this patent is extended or adjusted under 35 U.S.C. 154(b) by 702 days.

(21) Appl. No.: 17/158,985

(22) Filed: Jan. 26, 2021

(65) Prior Publication Data

US 2021/0227840 A1 Jul. 29, 2021

Related U.S. Application Data

(60) Provisional application No. 62/966,429, filed on Jan. 27, 2020.

(51) Int. Cl.
*A22C 17/00* (2006.01)
*A22C 7/00* (2006.01)

(52) U.S. Cl.
CPC ............ *A22C 17/002* (2013.01); *A22C 7/003* (2013.01); *A22C 17/0086* (2013.01); *A22C 17/0093* (2013.01)

(58) Field of Classification Search
CPC .................. A22C 17/002; A22C 7/003; A22C 17/0086; A22C 17/0093; A22C 17/0006;
(Continued)

(56) References Cited

U.S. PATENT DOCUMENTS 4,875,254 A   10/1989  Rudy et al.
5,064,667 A * 11/1991  Mally ................. A22C 7/0023
                                                    426/513
(Continued)

FOREIGN PATENT DOCUMENTS

EP         1174034 A1 *  1/2002  ........... A22B 5/0029
GB      2 364 894 A      2/2002
(Continued)

OTHER PUBLICATIONS

International Search Report and Written Opinion dated Jun. 11, 2021, issued in corresponding International Application No. PCT/US2021/014198, filed Jan. 20, 2021, 14 pages.

*Primary Examiner* — Drew E Becker
*Assistant Examiner* — Luis Eugenio Diou Berdecia
(74) *Attorney, Agent, or Firm* — Christensen O'Connor Johnson Kindness PLLC

(57) ABSTRACT

A system 10 for analyzing and trimming irregularly shaped food products which are to be subsequently pressed into a three-dimensional shape (volume) and optionally thereafter sliced or otherwise portioned so as to achieve an optimum harvest, includes a conveyor 12 for carrying the workpieces (WP) to be trimmed past a scanning system 14 for scanning the workpiece (WP) to ascertain the physical characteristics of the workpiece (WP), including, for example, its three-dimensional shape, as well as its position on the conveyor 12, and then past a cutting station 26 for trimming the workpiece (WP) into a desired two-dimensional shape which represents an optimum shape for the workpiece for pressing the workpiece into a desired three-dimensional shape having at least one fixed or specified dimension or other physical specification. Thereafter, the workpiece can be transferred to a slicing station utilizing high speed cutters or slicers for portioning/slicing the workpiece.

19 Claims, 8 Drawing Sheets

(58) Field of Classification Search
CPC .... A22C 17/02; A22C 17/12; B26D 2210/02; B26D 7/14; B26D 5/007; B26D 5/34; B26D 7/0625; G06T 7/0006
USPC .......................................................... 426/513
See application file for complete search history.

(56) References Cited

U.S. PATENT DOCUMENTS

| | | | |
|---|---|---|---|
| 5,334,084 A * | 8/1994 | O'Brien | A22B 5/20 452/157 |
| 5,365,816 A | 11/1994 | Rudy | |
| 5,585,603 A | 12/1996 | Vogeley, Jr. et al. | |
| 5,868,056 A | 2/1999 | Pfarr et al. | |
| 6,558,242 B2 * | 5/2003 | Veldkamp | A22B 5/166 452/134 |
| 6,854,590 B2 | 2/2005 | Rudy et al. | |
| 6,929,540 B2 * | 8/2005 | Johnson | A22C 17/0093 452/134 |
| 7,251,537 B1 * | 7/2007 | Blaine | A22C 17/0086 700/173 |
| 7,452,266 B2 * | 11/2008 | Bottemiller | B26D 7/30 700/173 |
| 7,593,785 B2 * | 9/2009 | Blaine | B26D 5/00 700/103 |
| 7,715,935 B2 | 5/2010 | Vogeley, Jr. et al. | |
| 7,841,264 B2 * | 11/2010 | Kim | B26D 7/018 83/13 |
| 7,949,414 B2 * | 5/2011 | Blaine | B26D 7/30 382/110 |
| 8,688,259 B1 * | 4/2014 | Blaine | B26D 5/007 700/103 |
| 9,128,810 B1 * | 9/2015 | Blaine | B26F 1/3813 |
| 10,654,185 B2 * | 5/2020 | Blaine | B26D 7/30 |
| 10,863,751 B2 * | 12/2020 | Blaine | B26D 7/0625 |
| 11,266,156 B2 * | 3/2022 | Blaine | G05B 17/02 |
| 11,475,977 B2 * | 10/2022 | Blaine | B26F 3/004 |
| 11,570,998 B2 * | 2/2023 | Pfanstiel | G06T 7/0004 |
| 2006/0162515 A1 * | 7/2006 | Vogeley, Jr. | A22C 25/18 83/13 |
| 2007/0051217 A1 * | 3/2007 | Weber | B26D 5/00 83/72 |
| 2012/0097002 A1 * | 4/2012 | Thiedig | G01B 11/046 83/365 |
| 2012/0307013 A1 * | 12/2012 | Hjalmarsson | A22C 17/0086 348/46 |
| 2020/0068908 A1 | 3/2020 | Blaine | |
| 2020/0375203 A1 | 12/2020 | Pfanstiel et al. | |

FOREIGN PATENT DOCUMENTS

| | | | | |
|---|---|---|---|---|
| GB | 2421676 A * | 7/2006 | | A22C 17/00 |
| WO | 2020/243280 A1 | 12/2020 | | |

\* cited by examiner

TRIMMING WORK PRODUCTS TO OPTIMIZE PRESSING

CROSS-REFERENCE TO RELATED APPLICATION

This application claims the benefit of U.S. Provisional Application No. 62/966,429, filed Jan. 27, 2020, the entire contents of which are incorporated herein by reference.

BACKGROUND

Slaughterhouses portion hog carcasses into two similar halves by cutting down the middle of the backbone. The hog halves are then further portioned into primal cuts including the front and rear hocks, fat back, loin, belly, shoulder, ham, and jowl. The ham and shoulder cuts are generally removed before sectioning the midsection of the hog. The midsection contains the fat back, loin, ribs, and belly. The pork belly is the cut of meat taken from the hog half midsection after removal of the loin, fat back and ribs. Pork bellies are trimmed of fat and defects into a generally rectangular shape. The pork belly may vary in thickness about its area and have contours or concaves in its outer surface.

Moreover, the pork belly is characterized by a notch at one end of the belly. The notch is caused by/results from removal of the ham and/or the loin from the hog half. As such, the exact location, configuration, and size of the notch can vary significantly from hog to hog. Pork bellies are cut into bacon slices, but before doing so the pork bellies are pressed into a rectangular shape before being fed into a high-speed slicer. The slicer cuts across the belly to form the bacon slices of uniform dimensions, specifically of uniform width.

It is desirable that the bacon slices are of sufficient quality, as defined by various desirable attributes or characteristics of the bacon slices. Many of these attributes or characteristics are based on the fact that there is significant variation of the anatomy from one pork belly to another. Some of the attributes or characteristics of bacon slices include the thickness of the bacon slice, the length of the bacon slice, the height range of the bacon slice along its length, the heights of the ends of the bacon slice, the minimum height along the length of the bacon slice, the flatness of the top surface of the bacon slice, the extent of depressions or concavities in the top surface of the bacon slice, the depth of the concavity, as well as the area of the concavity, the total area of the bacon slice, as well as other attributes and characteristics.

Due to the above attributes or characteristics, it is necessary to press the pork belly prior to slicing. The pressing of the pork belly flattens the pork belly so that at least the bottom of the pork belly is substantially planar. Also, the sides of the pork belly are pressed so that the width of the pork belly, and thus the length of the bacon slices, are uniform. In addition, the ends of the pork belly are pressed so that uniform slices can be harvested from the ends of the pork belly even though in raw form the ends of the pork belly may be jagged or otherwise non-uniform.

However, the pressing of the pork belly can result in blowouts, cracks, tears, splits or even thin areas in the bacon slices, caused in part by having to significantly compress or otherwise redistribute sections of the pork belly that are overly thick or overly thin. In this regard, conventionally pork bellies are trimmed to have straight parallel sides before pressing. The present disclosure seeks to trim the sides of the pork belly along a curved or otherwise nonlinear paths thereby widening or narrowing the width of the pork belly based on the physical characteristics of the pork belly including its thickness and cross-sectional area, in an effort to reduce the possibility of blowouts, cracks, splits and thin areas from the pressing operation to thereby avoid downgrades in the pressed pork belly into "seconds" or other reduced categories. Also, the present disclosure seeks to obtain a better yield from the raw pork belly as described herein.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an embodiment of the present disclosure, a method for trimming an irregularly shaped work product to be subsequently pressed into a three-dimensional shape having at least one specific physical specification, comprising:
  a) scanning the irregularly shaped work product to obtain data regarding the physical characteristics of the work product;
  b) generating a three-dimensional model of the scanned work product based on the scanning data;
  c) simulating pressing the three-dimensional model of the scanned work product into the three-dimensional shape;
  d) based on the results of the simulating step, determining a pattern for trimming the work product so that when pressed into the three-dimensional shape, the pressed work product is altered in shape to achieve the at least one specific physical specification; and
  e) trimming the work product according to the determined trimming pattern.

In any embodiment described herein, wherein the at least one specific physical specification of the pressed three-dimensional shape includes one or more of the width, length, height, thickness, area, volume, and flatness of the pressed three-dimensional shape.

In any embodiment described herein, wherein in trimming the work product in accordance with the determined trimming pattern, the pressed work product is facilitated into achieving the at least one specific physical specification.

In any embodiment described herein, wherein trimming the work product so as to maintain the structural integrity of the work product when pressed.

In any embodiment described herein, wherein when the trimmed work product is pressed into the three-dimensional shape, the mass of the trimmed work product coincides with the mass of the pressed three-dimensional shape.

In any embodiment described herein, wherein simulating the pressing of the modeled work product into the three-dimensional shape, comprising:
  a) simulating dividing the modeled work product into individual sections;
  b) measuring at least one physical characteristic of the simulated individual sections;
  c) determining the variance of the measured at least one physical characteristic of the simulated individual sections from the normative corresponding physical characteristic(s) of the work product.

In any embodiment described herein, comprising determining for the simulated individual sections the variance of at least one of the height and volume of the simulated individual sections from the normative height and volume of the work product.

In any embodiment described herein, wherein the simulated individual sections of the work product are taken along at least one of: the width of the work product; the length of the work product; and the height of the work product.

In any embodiment described herein, wherein the at least one physical characteristic of the simulated individual section includes one or more of the width, length, height, thickness, area, volume, and flatness of the simulated individual section.

In any embodiment described herein, further comprising:
a) mapping an initial two-dimensional area on the modeled work product to be subsequently pressed into the three-dimensional shape;
b) simulating pressing the three-dimensional model of the scanned workpiece coinciding with the mapped two-dimensional area, into the three-dimensional shape; and
c) based on the results of the simulating step, determining a trimming pattern for the work product so that when pressed into the three-dimensional shape, the pressed work product achieves the at least one specific physical specification.

In any embodiment described herein, further comprising:
a) mapping a two-dimensional area on the modeled work product; and
b) simulating dividing the modeled work product corresponding to the mapped two-dimensional area into individual sections.

In accordance with another embodiment of the present disclosure, a method of trimming an irregularly shaped work product to be subsequently pressed into a three-dimensional generally rectangular shape having at least one specific physical specification, comprising:
a) scanning the irregularly shaped work product to obtain data regarding the physical characteristics of the work product;
b) generating a three-dimensional model of the scanned work product;
c) analyzing the modeled work product in sections;
d) ascertaining at least one physical characteristic of the analyzed sections related to the ability of the work product to be pressed into the three-dimensional shape;
e) determining the variance between the at least one physical characteristic of the analyzed section of the work product relative to the nominal corresponding physical characteristic(s) of the work product;
f) based on the results from step (e), determining a trimming pattern for the work product so that when pressed into the three-dimensional shape, the work product achieves the at least one specific physical specification; and
g) trimming the work product according to the trimming pattern.

In any embodiment described herein, wherein the analyzed sections of the modeled work product comprise sections of the work product across the width of the work product, along the length of the work product, and/or along the height of the work product.

In any embodiment described herein, wherein the at least one specific physical characteristic of the analyzed sections of the work product including one or more of the width, length, thickness, height, area, volume, and flatness of the sections.

In any embodiment described herein, wherein the at least one physical characteristic including one or more of the width distribution of the analyzed sections; the length distribution of the analyzed sections; the thickness distribution of the analyzed sections; the height distribution of the analyzed sections; the area distribution of the analyzed sections; the volume distribution of the analyzed sections; and the flatness distribution of the analyzed sections.

In any embodiment described herein, further comprising transmitting the trimming pattern to a pressing apparatus for pressing the work product into the three-dimensional shape.

In any embodiment described herein, further comprising transmitting information regarding the physical characteristics to the pressing apparatus.

In accordance with another embodiment of the present disclosure, a method for developing a trimming pattern for a pork belly having longitudinal side edges to be subsequently pressed into a rectilinear volume of a desired width, comprising:
a) scanning the pork belly to obtain data regarding the physical characteristics of the pork belly including the width distribution and volume distribution of the pork belly;
b) generating a three-dimensional model of the pork belly;
c) simulating slicing the modeled pork belly into virtual slices extending across the width of the pork belly;
d) determining the height and volume of the simulated slices;
e) determining for the simulated slices the variance from the average height and volume of the modeled pork belly;
f) using the variance determinations to develop a trimming pattern for the pork belly so that upon pressing the pork belly into the rectilinear shape, the desired width of the pressed pork belly is achieved while seeking to maintain the structural integrity of the pork belly.

In any embodiment described herein, wherein seeking to maintain the structural integrity of the pork belly comprises seeking to avoid fractures, cracks, splits, blowouts, and thin areas of the pressed pork belly.

In any embodiment described herein, further comprising:
a) mapping an initial two-dimensional area on the pork belly to select a portion of the pork belly to be harvested from the pork belly based on the three-dimensional model of the pork belly; and
b) simulating slicing the pork belly corresponding to the mapped two-dimensional area of the pork belly.

In any embodiment described herein, in mapping an initial two-dimensional area to select a portion of the pork belly to be harvested:
determining for each of the simulated slices the variance for desired physical attributes of the slices;
rating the overall selected portion of the pork belly corresponding to the mapped two-dimensional area and location based on the extent to which of the simulated slices possesses the desired physical attributes of the slices until an optimum two-dimensional area and location on the workpiece is obtained.

In any embodiment described herein, comprising rating the overall selected portion of the pork belly to be harvested according to an optimization function as applied to the designated physical characteristics of the final pieces to be divided from the selected portion.

In any embodiment described herein, further comprising:
determining at least one of the height distribution and volume distribution of the simulated slices; and
comparing the at least one of height distribution and volume distribution with the average height and volume of the modeled pork belly;

based on the variance of the at least one height distribution and volume distribution of the simulated slice from the average height or volume of the modeled pork belly, developing a pattern for trimming the pork belly.

In any embodiment described herein, wherein in developing the trimming pattern of the pork belly, seeking to adjust the mass of the simulated slice with the average mass of the work product.

In any embodiment described herein, wherein the pattern for trimming of the pork belly extends along at least one side edge of the pork belly.

In any embodiment described herein, wherein the pattern for trimming the pork belly extends along both edges of the pork belly.

In any embodiment described herein, wherein the desired width is a fixed width along the length of the pork belly.

In accordance with another embodiment of the present disclosure, a method of trimming a pork belly by trimming along the trimming pattern determined by any embodiment described herein.

In accordance with another embodiment of the present disclosure, a control system for controlling a system for trimming a stream irregularly shaped work products while being conveyed on a conveyor system to be subsequently pressed into three-dimensional shapes having at least one specific physical specification, comprising, the conveyor system transporting the work products past a scanner apparatus for scanning the workpiece to obtain electronic data regarding the physical characteristics of the work products and past a cutter for trimming the work products according to a cutting pattern determined by the control system, the control system comprising:
  a) generating a three-dimensional model of the scanned work products based on the scanning data;
  b) simulating pressing the three-dimensional model of the scanned work products into the three-dimensional shape;
  c) based on the results of the simulating step, determining a pattern for trimming the work products so that when pressed into the three-dimensional shapes, the pressed work products are altered in shape to achieve the at least one specific physical specification; and
  d) controlling the cutter to trim the work product according to the determined trimming pattern.

In any embodiment described herein, wherein the at least one specific physical specification of the pressed three-dimensional shape includes one or more of the width, length, height, thickness, area, volume, and flatness of the pressed three-dimensional shape.

In any embodiment described herein, wherein in trimming the work product in accordance with the determined trimming pattern, the pressed work product is facilitated into achieving the at least one specific physical specification.

In any embodiment described herein, comprising determining for the simulated individual sections the variance of at least one of the height and volume of the simulated individual sections from the normative height and volume of the corresponding individual sections of the pressed work product.

In any embodiment described herein, wherein the simulated individual sections of the work product are taken along at least one of: the width of the work product; the length of the work product; and the height of the work product.

In accordance with another embodiment of the present disclosure, a non-transitory computer-readable medium including computer-executable instructions which, when loaded onto a computer, perform a method, comprising:
  a) designating at least one specific physical specification for a work product pressed into a three-dimensional shape from an irregularly shaped initial work product that has been trimmed according to a pattern determined to facilitate achieving the at least on specific physical characteristic of the work product;
  b) scanning the work product to obtain data regarding the physical characteristics of the work product;
  c) generating a three-dimensional model of the scanned work product based on the scanning data;
  d) simulating pressing the three-dimensional model of the scanned work product into the three-dimensional shape;
  e) based on the results of the simulating step, determining a pattern for trimming the work product so that when pressed into the three-dimensional shape, the pressed work product is altered in shape to achieve the at least one specific physical specification; and
  f) controlling the cutter to trim the work product according to the determined trimming pattern.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
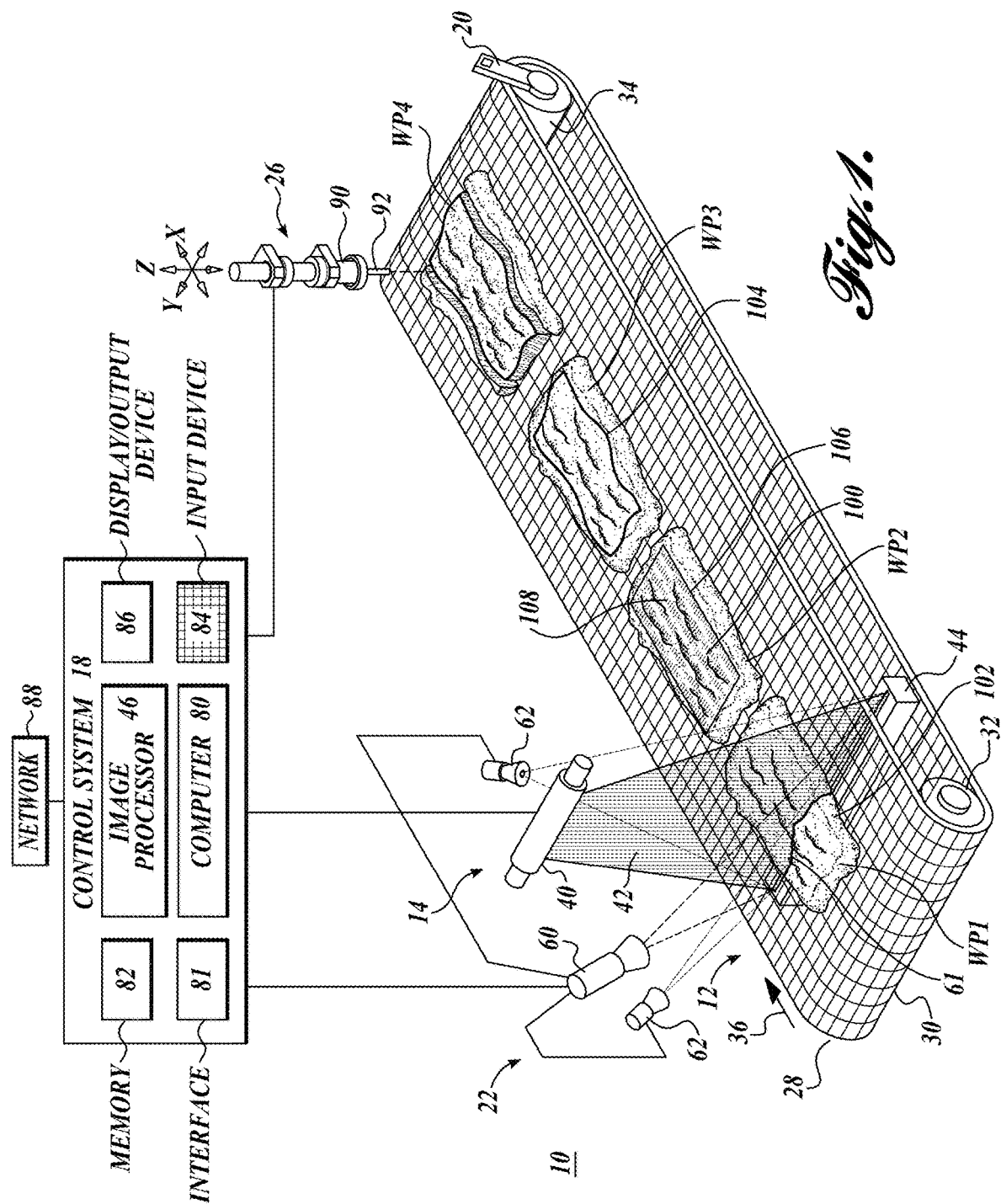
FIG. 1 is a schematic view of a workpiece trimming system.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "work product or "workpiece" synonymously. One example of a work product or workpiece described in the present application is a pork belly. However, the present invention can apply other foods, such as poultry or beef, as well as to work products/workpieces that are not food items.

In the following description and in the accompanying drawings, corresponding systems, assemblies, apparatus and units may be identified by the same part number, but with an alpha suffix. The descriptions of the parts/components of such systems assemblies, apparatus, and units that are the same or similar are not repeated so as to avoid redundancy in the present application.

FIG. 1 schematically illustrates an embodiment of the present disclosure consisting of a system 10 for analyzing and trimming work products, for example, in the form of pork bellies (WP) and other irregularly shaped food and non-food products which are to be subsequently pressed into a three-dimensional shape (volume) and optionally thereafter sliced or otherwise portioned so as to achieve an optimum harvest from the work product, bearing in mind achieving a maximum yield together with a desired quality level of the pressed work product. The system 10 includes a conveyor 12 for carrying the workpieces (WP) to be trimmed prior to subsequent pressing of the workpiece. Although a singular conveyor 12 is shown, multiple conveyors can be used with the system 10 or the conveyors can be a sufficient width so that multiple lanes of workpieces are carried by the conveyor.

The system 10 also includes a scanning system 14 for scanning the workpiece WP to ascertain the physical characteristics of the workpiece WP, including, for example, its three-dimensional shape, as well as its position on the conveyor 12.

The system 10 further includes a cutting station 26 for trimming the workpiece WP into a desired two-dimensional shape which represents an optimum shape for the workpiece for pressing the workpiece into a desired three-dimensional shape having at least one fixed or specified dimension or other physical specification, for example, the width of the workpiece. After trimming the workpiece at cutting station 26, and subsequent pressing of the workpiece into a desired three-dimensional shape, the workpiece can be transferred to a slicing station utilizing high speed cutters or slicers for portioning/slicing the workpiece.

The scanning system 14 scans the workpiece WP to produce electronic scanning data representative of physical characteristics the workpiece and forwards the electronic scanning data to a processor or computer 80. The processor analyzes the electronic scanning data to determine the physical characteristics and parameters of the workpiece pertaining to, for example, the size, shape, and other physical aspects of the workpiece. Such characteristics and parameters may include, for example, the length, width, aspect ratio, thickness, thickness profile, height, surface contours, outer contour configurations, perimeter, outer perimeter configuration, outer perimeter size and shape, volume and/or weight, as well as whether the workpiece contains any undesirable materials, such as bones, fat, cartilage, metal, glass, plastic, etc., and the location of the undesirable materials in the workpiece.

Using the determined physical characterization of the workpiece WP, once the workpiece has been physically characterized, an optimization process can be carried out by the use of processor 20 to determine how the workpiece might be trimmed so that when subsequently pressed into a three-dimensional shape, one or more specific dimensions of the three-dimensional shape is achieved while at the same time seeking to maintain the structural integrity of the food product.

In this regard, for meat type work products, maintaining the structural integrity includes avoiding fractures, cracks, splits, blowouts, and overly thin areas of the pressed workpiece. As such, the quality of the workpiece is maintained after pressing so as to avoid having the workpiece downgraded into a "seconds" category or other reduced quality category. In addition to maintaining the desired quality level of the pressed three-dimensional workpiece, it is also desirable to maximize the harvest quantity of the workpiece.

The foregoing goals are addressed by simulating the pressing of the three-dimensional model of the scanned workpiece into the three-dimensional shape having at least one specific dimension. Such simulation may involve determining how the physical characteristics of the workpiece varies along its length, width, height, etc. relevant to the workpiece in general, i.e., the nominative workpiece. This information can be used to determine how to trim the workpiece so that when the workpiece is pressed into the three-dimensional shape and the workpiece altered in shape, the at least one specific dimension is achieved. In this regard, the trimming of the workpiece induces the workpiece to achieve the at least one specific dimension when pressed The simulating of the pressing of the three-dimensional model of the scanned workpiece can include simulating dividing the modeled workpiece into individual sections and then measuring or otherwise determining one or more physical characteristics of the simulated individual sections. Thereafter, the variance is determined between the measured physical characteristics of the simulated individual sections of the workpiece from the nominal or average physical characteristics of the modeled work product. This information can be used to determine how to trim the work product prior to pressing so that the work product can be successfully pressed to achieve the at least one specific dimension or other physical specification of the pressed workpiece, as well as meeting the other goals listed above.

The simulated individual sections of the workpiece can be taken along, for example, the width of the workpiece, the length of the workpiece, as well as the thickness of the workpiece. For these individual sections, the height of the section can be determined as well as the volume of the section. This determination can be compared with the nominal or average height of the workpiece as well as the nominal or average volume of the workpiece. If, for example, the height of the simulated section is significantly greater than the nominal or average height of the workpiece, and if the volume of the simulated section is greater than the average or nominal volume of the workpiece, then mass can be removed from this section of the workpiece so that when the workpiece is subsequently pressed, the height and volume of the pressed workpiece at the simulated section will more closely coincide with the nominal or average height and volume of the workpiece.

Moreover, when the trimmed product is pressed into the three-dimensional shape, the mass of the pressed three-dimensional shape corresponds to the mass of the trimmed workpiece prior to pressing.

Rather than using the height and/or volume of the simulated sections of the workpiece, other specific dimensions of the simulated sections can be utilized, for example, the width, the length, the thickness, the area, the flatness, or other physical attributes of the simulated sections of the modeled workpiece.

As noted above, one specified dimension or other physical specification of the pressed workpiece may be the width of the workpiece. Other examples may include one or more of the length, height, thickness, area, volume, and flatness of the pressed three-dimensional shape.

In a further aspect of the present disclosure, the processor 80 is utilized to map an initial two-dimensional area 108 (FIG. 1), 108A (FIG. 5), or 108B (FIGS. 6 and 7) on the workpiece, which defines the portion of the workpiece to be harvested and then subsequently pressed into the three-dimensional shape having at least one specific desired dimension. This initial two-dimensional area selection can be based on the generated three-dimensional model of the workpiece. The processor simulates the end products desired from the workpiece achieved after the pressing operation, corresponding to the mapped two-dimensional area of the workpiece. The processor determines the extent to which these end products exhibit the desired physical characteristics of the end products. This information is used to achieve an overall rating of the selected portion of the workpiece to be harvested corresponding to the two-dimensional area, based on the extent to which the end products of the pressed workpiece possess the designated physical characteristics of such end products.

This process can be iteratively repeated wherein a further two-dimensional area is mapped on the workpiece, and the simulated end products from the pressed workpiece are analyzed to determine if the designated physical characteristics of the end products are met. This iterative process can be continued until an optimum two-dimensional area and location of the workpiece is identified. This process is described in U.S. patent application Ser. No. 16/552,858, assigned to the assignee of the present application and incorporated herein by reference.

Thereafter, the processor simulates pressing the three-dimensional model of the workpiece corresponding to the identified two-dimensional mapped areas 108 or 108A of the workpiece. As discussed above, based on the results of this simulating step a trimming pattern 104 of the work product is determined. Thereafter, the work product is trimmed so that when pressed into the desired three-dimensional shape, the pressed workpiece coincides with the at least one specific dimension or physical characteristics required of the pressed workpiece.

Conveyor

Next, describing the foregoing aspects of the processing system 10 in more detail, referring to FIG. 1, conveyance device 12 is in the form of a belt conveyor 28 having an endless belt 30 trained over end rollers 32 and 34. The encoder 20 is associated with the end roller 34. The roller 34 is powered so as to drive the conveyor belt in the downstream direction as shown by arrow 36 past the X-ray scanner 14, optical scanner 22, and cutting station 26. As noted above, the encoder 20 monitors the location or position of the belt 30 along the length of the conveyor 28.

The belt 30 is illustrated as being of open form or grid construction so that the water jet(s) at the cutting station 26 is (are) free to pass downwardly through the belt to a collection tank or other receptacle, not shown, positioned beneath the conveyance device. Various constructs of conveyor belts corresponding to belt 30 are described in U.S. Pat. No. 6,854,590, incorporated by reference herein.

Scanning

The scanning of the workpiece WP can be carried out by various techniques, including X-ray scanning, or optical scanning, or using both X-ray scanning and optical scanning. As shown in FIG. 1, an X-ray scanner 14 may be utilized to ascertain physical parameters of the work product, including the size and/or shape of the work product WP. More specifically, the length, the width, aspect ratio, thickness, thickness profile, contour, outer contour, outer perimeter, outer perimeter shape, volume, and/or weight of the work product. The data from the X-ray scanner is transmitted to a control system 18 which is coordinated with the corresponding data from an encoder 20 associated with a conveyance device 12 so as to match the X-ray scanning data with positions on the conveyance device corresponding to locations along the work product WP being scanned.

The system 10 also includes an optical scanner, which is identified in FIG. 1 as 22 and positioned relative to the conveyance device 12 to simultaneously scan the work product with the X-ray scanning being conducted. The optical scanner can also ascertain the physical parameters of the work product as noted above with respect to X-ray scanning. The data from the optical scanning is also transmitted to the control system 18 and can be used to develop a height profile of the work product.

The thickness profile of the work product determined from the X-ray scanner is based on the mass and assumed density of the work product. Thus, if there is a void within the work product or an undercut at the bottom of the work product, this can be ascertained by the X-ray scanner due to the reduction in mass resulting from the void or undercut. On the other hand, the optical scanner ascertains the height and contours of the top exterior of the work product and does not take into consideration whether there is a void within the work product or an undercut beneath the work product. As such, the two profiles generated by the X-ray scanning and the optical scanning can be compared. If a void exists within the work product or an undercut exists beneath the work product, the thickness (height) of the work product as determined by the optical scanning will be larger than the thickness of the work product as determined from the X-ray scanning With this information, it is possible for the control system 18 to not only ascertain the existence of a void or undercut, but also more specifically the shape, size, and location of the void or undercut. This information can be used by the control system 18 in determining how to trim work product prior to pressing of the work product.

The need for mapping of the thickness data ascertained from the X-ray scanning with the thickness data ascertained from optical scanning can be reduced or perhaps eliminated if the X-ray scanner and optical scanner are configured to simultaneously scan the same location(s) of the work product.

Even if there still be a need for mapping thickness data from the X-ray and optical scanning operations, if the scanning occurs simultaneously, the matching or mapping of the data will likely be more accurate. Also, the matching/mapping may possibly be done with simple timestamps, and not with any need for monitoring of the position of the work pieces on the belt with encoder "counts" or other monitoring techniques.

Further details with respect to the X-ray scanning and the optical scanning of the work product are set forth below and also can be found in U.S. Patent Application No. 62/855, 700, assigned to the assignee of the present application and incorporated by reference herein.

X-Ray Scanning

X-ray scanner 14 is used to inspect the work product WP to determine physical parameters of the work product, including as described above, the shape and size of the work product and further including, for example, the thickness and thickness profile of the work product. The X-ray scanner can also determine if undesirable material, such as bones, fat, metal, plastic, glass, is located within the work product.

Generally, X-rays are attenuated as they pass through an object in proportion to the total mass of the material to which the X-rays pass. The intensity of the X-rays received by an X-ray detector, after they have passed through the object such as work product WP, is inversely proportional to the total mass of the object. For example, X-rays passing through a work product that has a void or an undercut will be less attenuated as X-rays that pass through the work product without an undercut or void. Thus, the portion of a work product at which a void or undercut is located will be analyzed as being of lesser thickness than adjacent the sections of the work product without an undercut or void.

Further, using a given value for the density of the work product being analyzed, whether beef, poultry or fish, the dimensional thickness of the work product can be calculated. This information can be determined for the entire volume of the work product. A general description of the nature and use of X-rays in processing food products can be found in U.S. Pat. No. 5,585,603, incorporated herein by reference.

As noted above, system 10 includes a position sensor in the form of encoder 20 that generates a signal indicative of the position of the belt 30, and thus the work product WP, along the length of the conveyor 28. As the work products move along the conveyor 28, with respect to X-ray scanner 14 the position of the work product along the length and width of the conveyor belt 30 can be ascertained by the X-ray system. As noted above, the X-ray scanner can also provide other information with respect to the physical parameters of the work product in addition to the thickness or the thickness profile of the work product described above. Such physical parameters include, for example, the length, width, aspect ratio, contour, outer contour configuration, perimeter, outer perimeter configuration, outer perimeter size and/or shape, volume and/or weight of the work product. With respect to the outer perimeter configuration of the work product, the X-ray scanner can be used to determined locations along the outer perimeter of the work product including based on an X-Y coordinate system or other coordinate system.

The X-ray scanner 14 includes an X-ray source or generator 40 for emitting X-rays 42 downwardly toward the work product. An X-ray detector 44 is located beneath the upper run of the conveyor belt 30 for receiving the X-rays 42 that have passed through the work product. The X-ray detector 44 includes a linear array of detector units extending across the underside of the conveyor belt 30 to generate a signal corresponding to the intensity of the X-rays impinging thereon. The signals generated by the X-ray detector 44 are transmitted to an image processor 46, which forms part of the overall control system 18. The control system processes the data signals from the X-ray detector 44 to determine physical parameters of the work product, including the thickness profile of the work product, across the width of the work product as well as along the length of the work product. As noted above, the physical parameters ascertainable from the X-ray scanning also includes the shape and size of the work product as well as the location of the work product on the conveyor belt 20.

Figure 2:
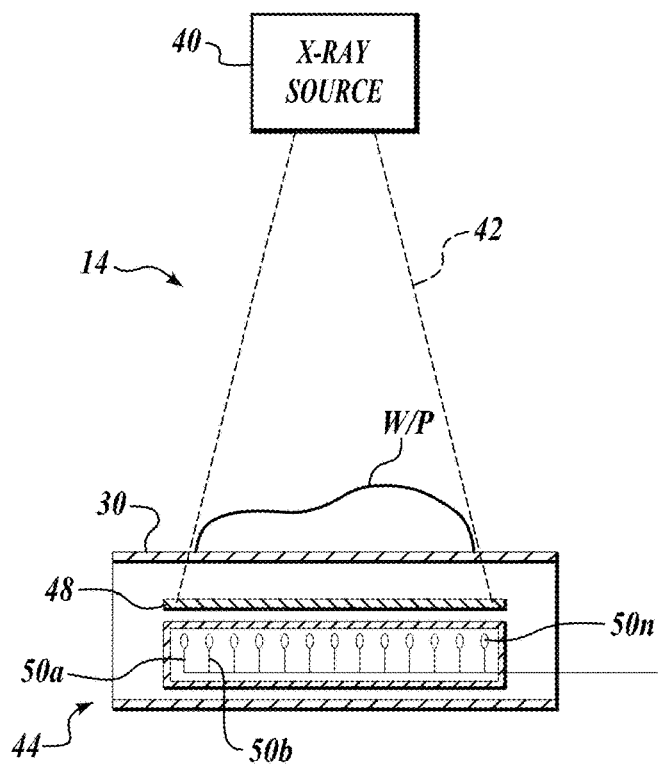
FIG. 2 is a schematic view of an X-ray scanner which may be utilized in the system and method of the present disclosure.

Referring to FIG. 2, an X-ray detector 14 is illustrated as including a layer or strip of scintillator material 48 located above a plurality of photodiodes 50a-50n. The X-ray source or generator 40 is located a sufficient distance above the conveyor belt 30 so that the X-rays 42 emitted from the generator 40 completely encompass the length of the X-ray detector 44 that extends across the conveyor belt 30. The X-rays 42 pass through the work product WP, through the upper run of the conveyor belt 30, and then impinge upon the layer or strip of scintillator material 48. Since the photodiodes 50a-50n respond only to visible light, the scintillator material 48 is used to convert the X-ray energy impinging thereon into visible light flashes that are proportional to the strength of the received X-rays. The photodiodes 50a-50n generate electrical signals that have an amplitude proportional to the intensity of the light received from the scintillator material 48. These electrical signals are relayed to the image processor 46.

As shown in FIG. 2, the photodiodes 50a-50n are arranged in a line across the width of the conveyor belt 30 for detecting X-rays passing through a line or "slice" of the work product WP. Alternative photodiode layouts are possible, for example, the photodiodes can be positioned in several rows to form a rectangular grid thereby to increase the scanning area of the X-ray detector 44, if desired.

Figure 3:
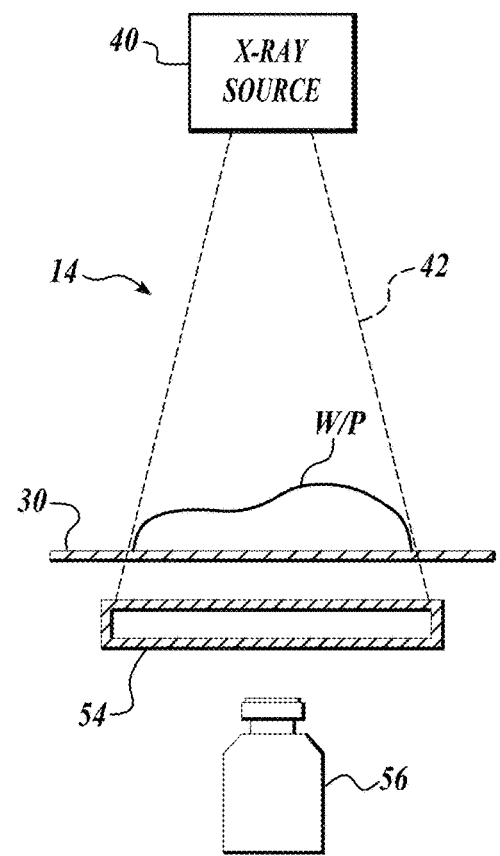
FIG. 3 is a schematic view of another X-ray scanner that may be utilized with a system and method of the present disclosure.

Other embodiments of an X-ray scanner can be utilized, which are also capable of detecting the intensity (or attenuation) of the X-rays that have passed through the work product WP to determine a thickness profile of the work product. For example, referring to FIG. 3, an alternative embodiment of an X-ray detector 14' includes a fluoroscope screen 54. The screen is activated to produce light flashes in proportion to the attenuation of the impinging X-rays 42. Light flashes are then recorded by a video camera 56 or other device capable of capturing the "picture" produced by the fluoroscope screen 54. The images captured by the video camera 56 are transmitted to image processor 46 and converted into digital values related to the intensity of the light generated by the fluoroscope screen 54.

Further alternatively, direct flat panel X-ray imaging technology or direct radiography may be used. For example, an array of amorphous selenium detectors may be used as an X-ray detector to directly detect the intensity of the impinging X-rays, and to transmit data in this regard to the image processor 46.

Other X-ray options include the use of a dual-energy X-ray source or the photon-counting, multi-bin X-ray system.

Further, other types of scanners may be employed, for example, infrared scanning, sonar/ultrasound scanning, CT scanning or MRI scanning Optical Scanning Referring to FIG. 1, optical scanner 22 is positioned along conveyance system 12. Optical scanning can be carried out using a variety of techniques, including with a scanner such as scanner 22, to view a work product WP illuminated by one or more light sources 60. The light from the light source(s) 60 is extended across the moving conveyor belt 30 to define a sharp shadow or light stripe 61, with the area forward of the transverse beam being dark. When no work product is being carried by the conveyor belt 30, the shadow line/light stripe 61 forms a straight line across the belt 30. However, when a work product WP passes across the shadow line/light stripe, the upper irregular surface of the work product produces an irregular shadow line/light stripe as viewed by video cameras 62 directed downwardly on the work product and the shadow line/light stripe 61. The video cameras detect the displacement of the shadow line/light stripe 61 (i.e., in the Z-axis direction) from the position it would occupy if no work product is present on the conveyor belt 30. This upward displacement of the light stripe 61 represents the "height profile" of the work product along the shadow line/light stripe as viewed by the optical scanner.

The length of the work product is determined by the length of time that the shadow lines 61 are created by the work product. In this regard, encoder 20 generates pulses at fixed time intervals corresponding to the forward movement of the conveyor belt 30. During such movement of the conveyor belt, the thickness profile of the entire work product in both the "X" and the "Y" direction relative to the conveyor belt is generated.

As shown in FIG. 1, the light source 60 and video cameras 62 are positioned relative to the X-ray scanner 14 so that the light stripe 61 coincides with and is aligned with the X-ray detector 44 positioned across the conveyor belt 30. As such, the X-ray scanner and the optical scanner simultaneously scan the same transverse location (slice) across the work product. This alignment of the light stripe 61 with the X-ray detector 44 may eliminate the need for transformation of the data from the X-ray scanner 14 with the data from the optical scanner 22 due to the work pieces moving or shifting. Though mapping of the data from the X-ray scanner to the data from the optical scanner may be required due to the somewhat different viewpoints for the x-ray detector and the optical cameras or during calibration or set up of the processing system 10.

Although a single light source 60 is shown in FIG. 1, multiple light sources can be utilized. For example, a second light source may be positioned on the opposite side of x-ray generator 40 from the light source 60.

Also although two cameras 62 are shown as in use in FIG. 1, a single camera can be used. However, "shadowing" can occur if a single camera is used. In this regard, the light stripe may be momentarily blocked from view of the single camera by a section of the workpiece that extends upward above the surrounding portions of the work piece. This may not be a problem or source of inaccuracy. But if shadowing results in missing height data, the x-ray image data would be used to fill in the missing data.

Further, as noted above, the processing system 10 is designed to ascertain whether or not there is a void in the work product WP or whether an undercut in the underside of the work product exists or whether or not the work product is lying flat on the conveyor belt 20. In this regard, as discussed above, the upward displacement of the light stripe 61 from the optical scanner provides the thickness of the work product, across the width of the work product at the location of the light stripe. However, optical scanning will not ascertain whether or not a void, undercut, etc., exists. Rather, the optical scanning instead provides the height profile of the upper surface of the work product WP relative to the top surface of the conveyor belt 30.

On the other hand, the X-ray scanning provides the actual thickness of the work product across the work product corresponding to the location of the X-ray detector. If a void, undercut or similar anomaly exists in the work product, the work product will be determined to be thinner at such location since the intensity of the X-rays passing therethrough will be greater than if no void, undercut or other anomaly exists. Thus, if the "thickness" of the work product from the optical scanning is compared with the thickness of the work product from the X-ray scanning, any different therein will indicate the presence of a void, undercut or similar anomaly causing reduced attenuation of the x-rays reaching the x-ray detector.

Figure 4A:
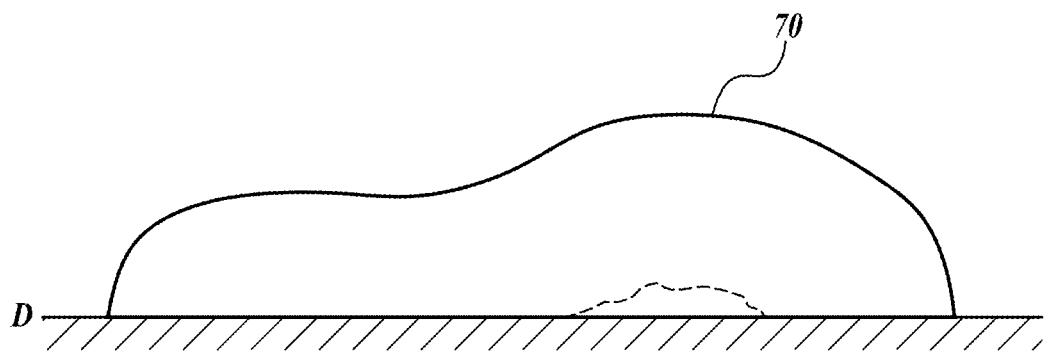
FIGS. 4A-4C are plots of thickness profiles of a work product generated by X-ray scanning and optical scanning showing the differences therebetween.
Figure 4B:
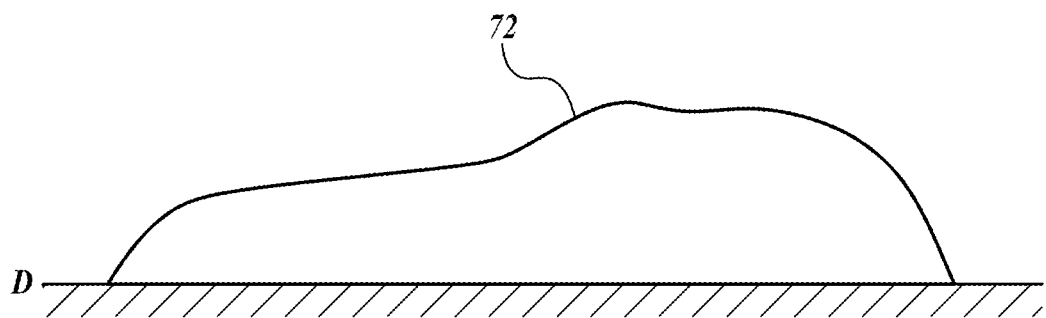
Figure 4C:
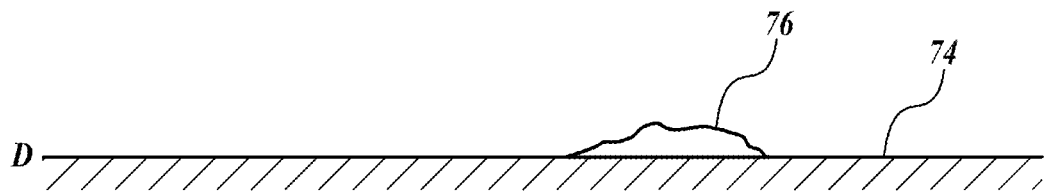

The foregoing analysis is schematically illustrated in FIGS. 4A-4C. In FIG. 4A, the profile line 70 depicts the thickness profile above the datum "D" across a "slice" of the work product as generated by optical scanner 22. The profile line 72 depicts the thickness profile above the datum "D" along the same slice of the work product as ascertained by the X-ray scanning Profile line 74 represents the height of the bottom surface work product when the X-ray height is subtracted from the optical height. For the most part, the profile line 74 is at a zero height above the datum because the height of the work product as determined by the optical scanning is the same as determined from the x-ray scanning. However, as shown in FIG. 4C, a section 76 of the profile line 74 is about the datum "D". Section 76 of the profile line 74 represents the shape, size and location of a void or undercut in the work product. Except at the location of the profile 74, the resulting height is zero relative to the datum "D". The above analysis enables the more accurate processing of the work product, for example, trimming the work product prior to pressing.

It will be appreciated that in certain types of food products, a relatively large undercut or void can occur, especially if the food product has curled or otherwise assumed a configuration that causes a work product to not lie flat on the conveyor belt 30. For example, it is not uncommon for the edges of a smoked pork belly to turn or curl under thereby causing significant portions of the underside of the pork belly to not lie flat on the conveyor belt on which the pork belly is being supported during cutting of the pork belly into fixed weight portions. This commonly occurs along the edges of the pork belly.

Chicken breasts, especially when very fresh, can have undercutting from the edge in, or at the very front towards the back. Also in chicken breasts when a muscle (the "tender") is removed, a hollow may occur, which is known as the "tender tunnel". This can cause inaccuracies when cutting or portioning the chicken breasts.

As discussed above, an assumed density value for the work product is used to translate the mass related data from the X-ray scanning to the height or thickness of the work product. In many situations, it will be assumed that the density value applies to the entire work product, for example, a chicken breast or fish fillet. In these situations, fat, which has less density than meat per se, is typically located around the edges of the meat. Further, the fat often is not of significant quantity, so errors caused by applying a generalized density value is typically relatively small. Further, if the fat present is on the surface of the food product is visible to the optical scanner, then the control system 18 can apply a different density value to the fat.

There are other types of food products, for example, pork bellies, that may consist of up to 50% fat, and such fat is interspersed throughout the muscle meat. In this situation, a generalized density value can be used that takes into consideration the likely level of fat in the food product.

Further, in meat food products, as indicated below, the density of fat is less than the density of the whole muscle meat. In this regard, the density of the food product being scanned can be calculated by dividing the mass measured from the X-ray scanning by the volume determined from the optical scanning. If the calculated density is less than the density of even the fat, then the conclusion is that there must be a void or undercut at the location of the food product being analyzed.

As a further matter, if it is known that the food product FP is lying flat on the conveyor belt 30, for example, if the food product has been pressed prior to scanning, then the above method for calculating density by dividing the mass determined from the X-ray scanning by the volume determination from the optical scanning can be used to determine the fat/protein muscle ratio in the food product.

For example, if the density of pork is 1.1 $g/cm^3$ and the density of fat in pork is 0.9 $g/cm^3$, if the density is calculated using the processes above as being 1.0, then pork belly being analyzed has a fat content of approximately 50%.

Referring to FIG. 1, as noted above, the X-ray scanner 14 and the optical scanner 22 are positioned relative to each other so that the same "slice" across the work product is being analyzed simultaneously by the X-ray scanning and the optical scanning Although this configuration of the portioning system 10 can simplify the analysis of the X-ray scanning and the optical scanning by not requiring translation of the data from the X-ray scanning into the data of the optical scanning or vice versa, it will be appreciated that the X-ray scanner may be positioned at a different location along the conveyance device 12 than the location of the optical scanner 22. In that case, it will be necessary to translate the data from the X-ray scanning into the data from the optical scanning. However, this process should be fairly straightforward in that both the X-ray scanning and optical scanning view the work product in slices across the width of the work product. The encoder data can be used to match the X-ray scanning data to the optical scanning data for the same slice location across the work product.

As noted above, the X-ray detector 44 is configured as a line array detector so as to receive X-rays along the same slice or line across the conveyor belt as the location of the light stripe 61 from the optical scanner 22. As also noted above, the X-ray detector instead can be configured as having a width along the length of the conveyor belt 20. In that situation, the data from the X-ray detector may need to be "associated" with the data from the optical scanner. In such case, the X-ray data may need to be transformed into the data from the optical scanner using existing transformation techniques.

Control System

FIG. 1 schematically illustrates control system 18 which controls the operation of processing system 10. The control system includes a computer 80 to which is operably connected the image processor 46 which receives the data from X-ray detector 44 as well as from the optical cameras 62 and processes such data for use by the computer. The control system also includes an interface 81 for receiving signals and information from encoder 20 as well as from other data sources of system 10, as described herein. A memory unit 82 is provided for storing information for use by the control system, including the computer 80. A keyboard or other input device 84 is provided to enable an operator to communicate with the control system 18. Also a display or other output device 86 is provided to convey information from the control system, including from computer 80 to the operator. As noted below, the control system 18 controls the operation of the portioning system 10, including conveyance device 12, X-ray scanner 14, optical scanner 22, and cutting station 26. The control system 18 can be connected to a network 88. Also, rather than employing a local computer 80, a network computing system can be used for this purpose.

Cutting Devices

Once the work product has passed by the X-ray and optical scanners 14 and 22, the work product WP moves on to cutting station 26. As described above, information from the X-ray scanner and optical scanner is analyzed to develop a model of the work product and then the control system analyzes the modeled work product to determine how the work product is to be trimmed so as to arrive at a pressed three-dimensional shape for the work product that meets one or more dimensional or other physical parameters. With that information, the control system 18 determines how the work product is to be trimmed.

Various types of cutting devices can be utilized at the cutting station 26 to cut or trim the work product as desired. One type of cutter 90 that may be used employs high-pressure water jets, as disclosed in U.S. Pat. Nos. 4,875,254, 5,365,816 and 5,868,056, incorporated herein by reference.

As schematically shown in FIG. 1, the water jet cutter 90 includes a nozzle 92 that may be moved relative to conveyor belt 30 longitudinally of the belt and laterally of the belt, as well as vertically relative to the upper surface of the belt. This enables the water jet cutter 90 to cut and/or trim the work product so as to achieve one or more desired configurations, sizes, portions, etc.

Although FIG. 1 only shows one water jet cutter 90, it is to be understood that at least several water jet cutters can be utilized in conjunction with the system 10 so as to achieve a desired production level. For example, four, eight or even more water jet cutters can be utilized in a coordinated fashion to cut and/or trim work products at cutting station 26.

Section Analysis

A generalized description of the system and method of the present disclosure set forth above, beginning toward the bottom of page 5. In another example of the method and system of the present disclosure, after the scanning of the work product by scanning system 14, such scanning information is transmitted to the processor 80 which utilizes such information to generate a three-dimensional model of the scanned work product. The processor 20 then analyzes the scanned modeled work product in sections, for example, sections 100 of work product WP2, schematically shown in FIG. 1. At least one physical characteristic of the analyzed section is ascertained. Thereafter, by using the processor 80, the variance between the physical characteristic(s) of the analyzed section and the nominal corresponding physical characteristic(s) of the work product is determined. In essence, an investigation is being conducted as to how the section of the work product being analyzed differs from the work product as a whole. For example, is the section being analyzed thicker or thinner than the average thickness of the work product. Also, is the volume of the work product being analyzed different from the volume of other sections of the work product as a whole.

As may be appreciated, if the analyzed portion of the work product is substantially thicker or substantially thinner than the work product as a whole, when the work product is pressed into a three-dimensional shape, it may be necessary for a significant shift of one or more portions of the work product relative to the rest of the work product during the pressing operation to achieve the desired three-dimensional shape of the work product such that the pressed work product conforms to one or more specific dimensions or other physical specification required of the pressed work product.

To this end, the work product can be trimmed so that more or less mass is present in the analyzed portion of the work product prior to pressing, so that the correct amount of mass is present when the work product is pressed into the three-dimensional shape. A trimming pattern can be created as sections of the modeled work product are analyzed.

As discussed above, the analyzed section of the work product can consist of sections across the width of the work product, sections along the length of the work product, as well as sections along the height or thickness of the work product.

As also discussed above, the specific physical characteristics of the analyzed sections of the work product in lieu of or in addition to the thickness or height of the section and the volume of the section can instead focus on the width of the section, the length of the section, the area of the section, the flatness of the section or other physical specification.

Pork Bellies

As a specific example of the present disclosure, the present method and system can be applied to the trimming of pork bellies prior to pressing the pork bellies into a rectilinear shape of a fixed width to ready the pork belly for slicing into bacon rashers. As shown in FIG. 1, such pork bellies WP1 have longitudinal side edges 102.

As in the examples of the present disclosure discussed above, the pork belly shown in FIG. 1 is scanned by scanning system 14 to obtain data regarding the physical characteristics of the pork belly, including, for example, its width distribution, thickness/height distribution and volume distribution along the length of the pork belly. With this information, a three-dimensional model of the pork belly is generated by the processor 80.

The method and system of the present disclosure next includes simulating the slicing of the modeled pork belly into virtual slices 100 extending across the width of the pork belly. For each slice, the height of the slice as well as the volume of the slice is determined. This information is compared with the average or nominal height of the pork belly as well as the average or nominal volume of the pork belly across the width of the pork belly. Knowing this information, the processor can determine how the pork belly might be trimmed, for example, along its side edges 102, so that when the pork belly is pressed, the work product can be reshaped into a desired rectilinear shape having a desired width for the pork belly.

As can be appreciated, if a simulated slice of the pork belly indicates that the height of the slice is less than the average height of the pork belly, the trimmed width of the pork belly may be increased relative to the nominal width of the pork belly so that additional mass is available to increase the thickness of the pork belly at such location when the pork belly is pressed, for example, from side to side.

On the other hand, if the simulated cross section of the pork belly indicates that the pork belly is of a thickness/height greater than the nominal thickness/height of a pork belly, pressing the pork belly in this area can damage the pork belly, for example, causing the pork belly to fracture, crack or split and thus not be of a continuous volume. If this occurs, the grade of the pork belly must be decreased. As a consequence, the value of the pork belly is lowered due to its inability to be processed or sold as a top grade product. As such, one endeavor of the method and system of the present disclosure is to maintain the quality of the pork belly by maintaining the structural integrity of the pork belly when pressed into a rectilinear shape prior to slicing.

Figure 5:
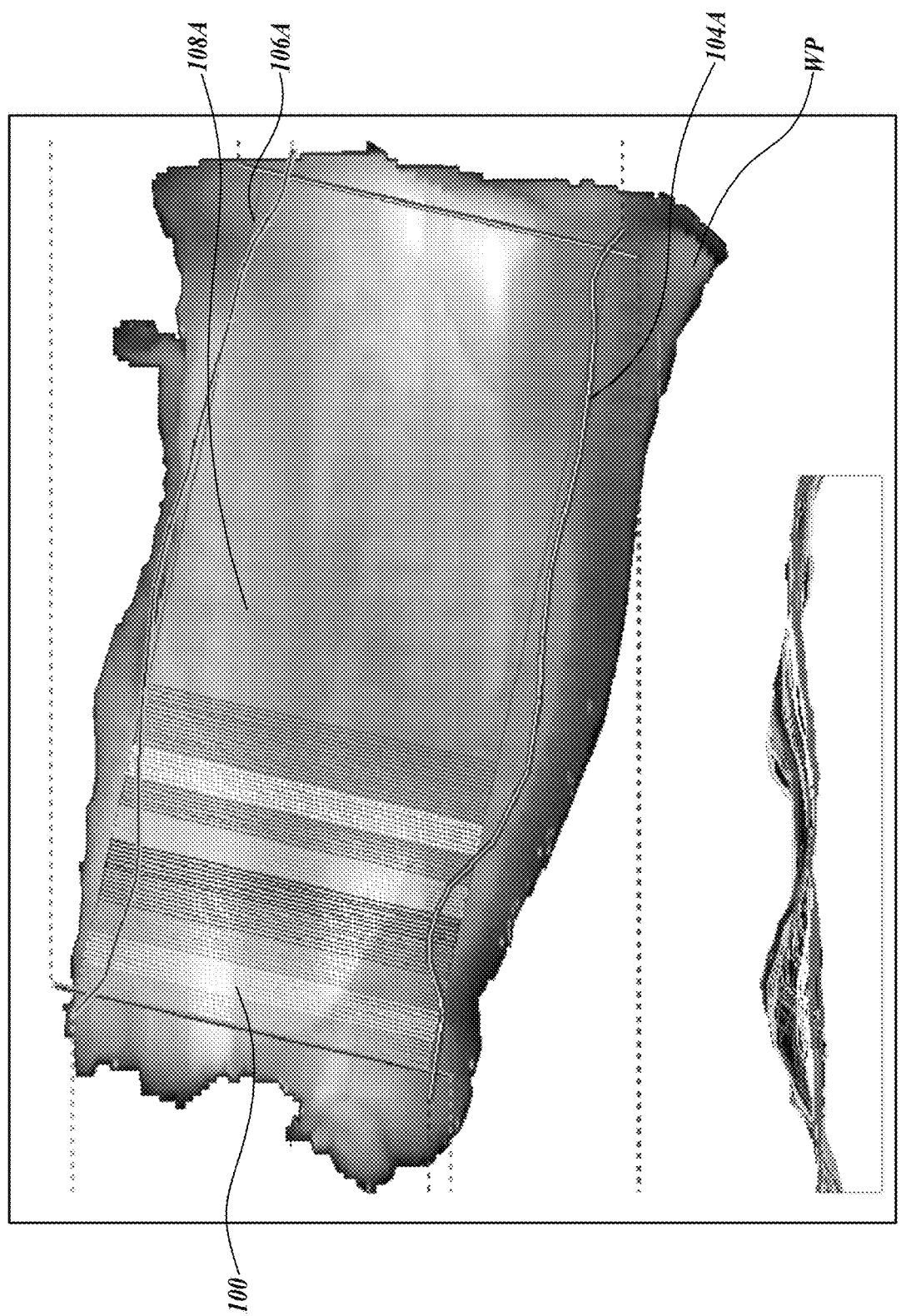
FIG. 5 is a schematic view showing the trimming pattern of a workpiece using the system and method of the present disclosure.
Figure 7:
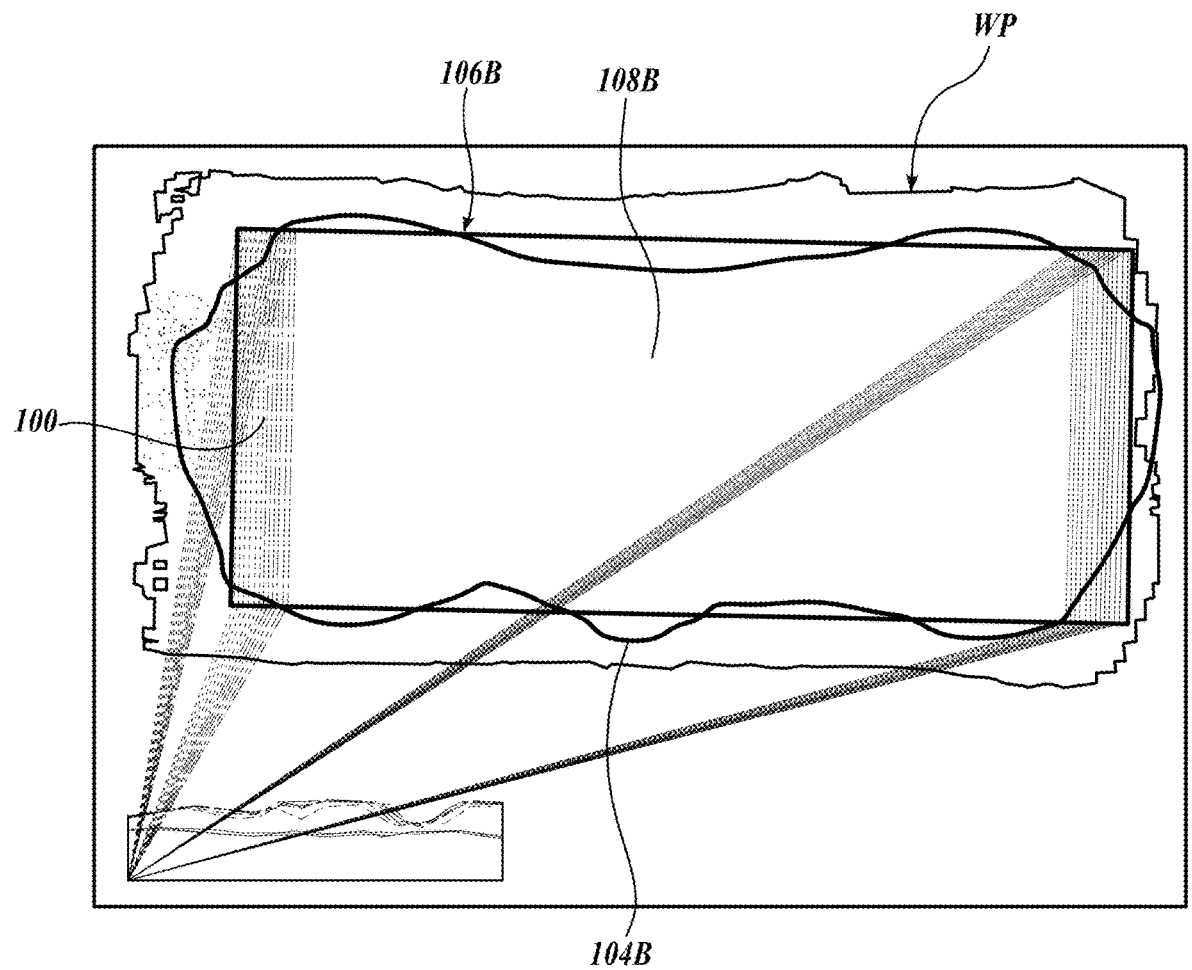
FIG. 7 is the workpiece of FIG. 3 showing the trimming pattern of the workpiece determined by using the system and method of the present disclosure.

FIGS. 1, 5 and 7 show cutting patterns 104, 104A and 104B for the pork belly that was determined by using the analysis methodology and system discussed above. These figures show that the cutting patterns 104, 104A and 104B of the pork belly is not straight along its sides 102, but rather is curved. The outwardly curved sections of the cutting patterns 104, 104A and 104B correspond to sections of the pork belly that are thinner than the nominal thickness of the pork belly, whereas sections of the cutting pattern that curve inwardly correspond to sections of pork belly having a thickness that is thicker than the nominal thickness of the pork belly.

As a consequence of calculating a curved cutting pattern for the pork belly, when the trimmed pork belly WP4 is pressed, for example, from side to side, as well as from top to bottom, the pressed pork belly is induced or facilitated to assume the desired three-dimensional shape of the pork belly that is then ready for slicing into rashers.

In this regard, the portions of the pork belly corresponding to the sections of the pork belly having an outwardly extending curved trimming patter are increased in thickness as the pork bellies press side to side. Correspondingly, the portions of the pork belly pertaining to the sections having a thickness greater than the nominal thickness of the pork belly is thinned by downward pressing of the pork belly. The upshot is that a pork belly of desired rectilinear shape is achieved without undue shifting or movement of the pork belly mass during pressing thereby reducing the likelihood of fractures, cracks, splits, or blowouts occurring to the pork belly during the pressing thereof.

Rather than simulating slices across the entire unpressed pork belly such as WP1 shown in FIGS. 1, 5, 6 and 7, the modeled pork belly can be mapped into an initial two-dimensional area on the pork belly, which represents the portion of the pork belly to be harvested and then pressed into a rectilinear shape. These figures depict mapped two-dimensional areas 108, 108A, 108B represented by perimeter 106, 106A and 106B. Although the perimeter 106 is illustrated as being substantially rectangular, such perimeter may be of other shapes, such as trapezoidal, to generally reflect that most pork bellies tend to decrease in thickness from one end to the other due to the anatomy of a hog.

The process of establishing the two-dimensional area on the mapped workpiece is discussed above and thus will not be repeated here. Nonetheless, once the two-dimensional area of the pork belly has been established, the simulating of the slicing of the pork belly is confined to such two-dimensional area. Further, using the height of the simulated pork belly section or the height distribution across the width of the pork belly as well as the volume of the simulated slice or the volume distribution of the simulated slice, such information can be compared with the average height and average volume of the modeled pork belly.

Based on such variance information, the processor 80 is able to determine a trimming pattern 104 for the pork belly that facilitates pressing of the trimmed pork belly into a desired rectilinear shape, with such shape having at least one specific dimension to be maintained, for example, the width of the pressed pork belly.

As shown in FIG. 1, both sides 102 of the pork belly as well as both ends of the pork belly are trimmed into a specific cutting pattern 104, 104A or 104B which varies from the rectangular shape 106, 106A or 106B of the initially mapped two-dimensional area 108, 108A, 108B of the pork belly selected to be portioned.

Information to Pressing Machine

A typical pressing machine presses the sides of the pork belly, presses down on the top of the pork belly, as well as presses against the ends of the pork belly. It can be appreciated that information pertaining to the manner in which the pork belly has been trimmed, such as into the shape of WP4 shown in FIG. 1, can be helpful in controlling the pressing of the pork belly, for example, the order in which the pork belly is pressed, the number of pressing steps used, and/or the pressure applied to the pork belly by the top, side, and/or end presses to a certain pressure.

As an example, it may be advantageous to first press downwardly on the top of the pork belly in an effort to achieve a more uniform thickness of the pork belly, and then press against the sides of the pork belly so as to achieve the desired width of the pork belly. However, if a significant portion of the pork belly is thinner than desired, it may be advantageous to first press the pork belly side to side to a set pressure or width to increase the thickness of the overly thin sections of the pork belly and then thereafter press downwardly on the pork belly so as to achieve a more uniform thickness of the pork belly.

The foregoing is meant only to provide examples of the manner in which the pork belly might be pressed based on information from the system 10 pertaining to the configuration of the pork belly and the manner in which the pork belly has been trimmed in preparation for subsequent pressing of the pork belly into a rectilinear shape.

Flow Diagrams of Methodology

Figure 8:
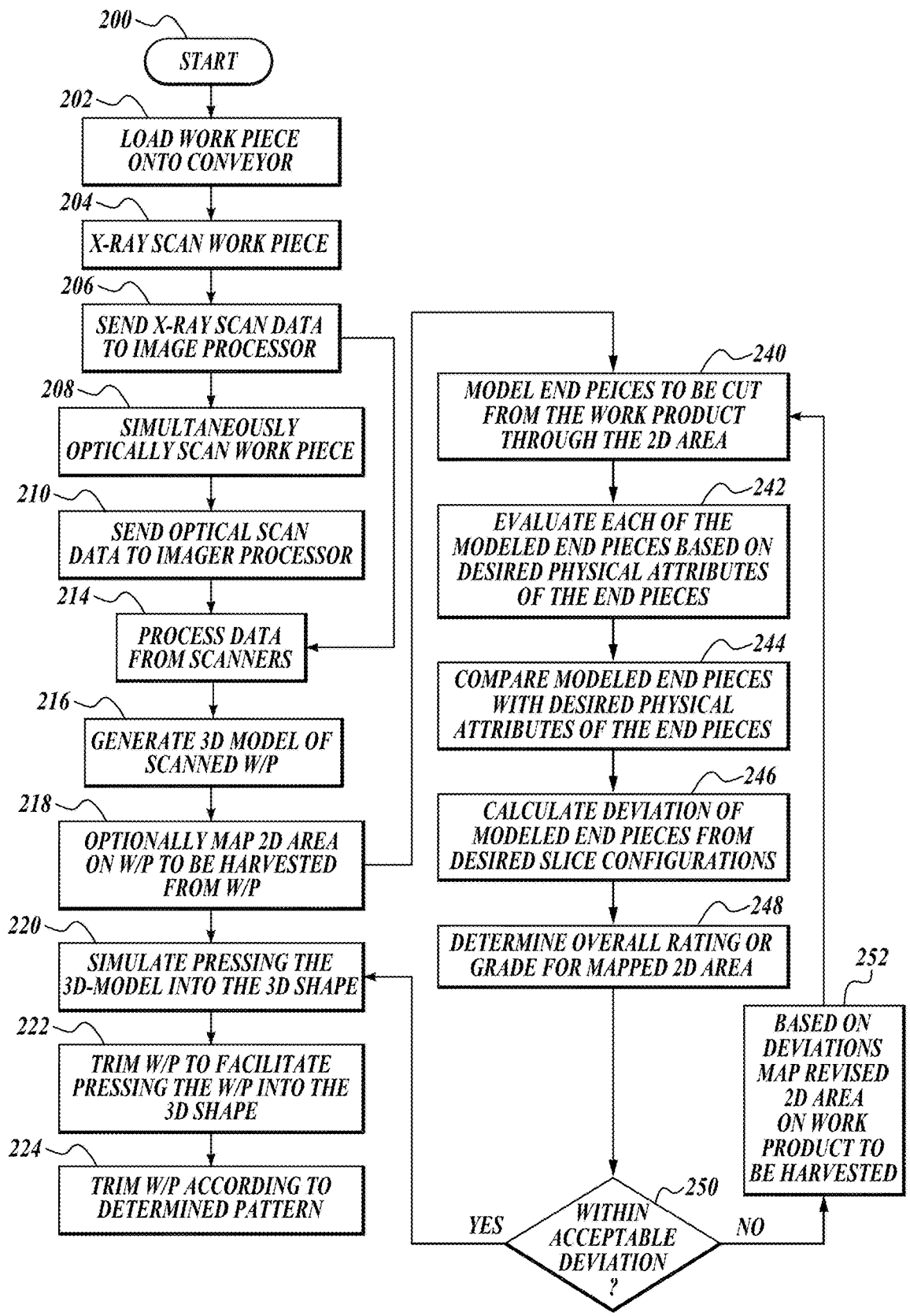
FIG. 8 is a flow diagram illustrating a process that may be carried out using the system of the present disclosure.

FIG. 8 consists of a flow diagram setting forth the method of utilizing the processing system 10 of the present disclosure, as shown in FIGS. 1-4. The process begins at step 200 wherein work products WP are loaded onto conveyor 28 at step 202. Thereafter, the work products are scanned at step 204 using X-ray scanner 22. Next, at step 206, the data from the X-ray scanning of the work product is transmitted to image processor 46.

Thereafter, at step 208, the work product is also optically scanned by scanner 22. At step 210, the data from the optical scanner is sent to the image processor 46.

Next, at step 214, data from the X-ray scanner and optical scanner is processed with the results of such processing made available to the computer 80 so that a three-dimensional model of the scanned work product can be generated at step 216. Such three-dimensional models are illustrated in FIGS. 1, 5, 6 and 7.

Next, optionally in step 218, a two-dimensional area 108 is mapped onto the top surface of the work product WP to represent the portion of the work product to be harvested and then pressed into a rectilinear three-dimensional shape. The mapped initial two-dimensional area 108 may be somewhat smaller than the overall size of the workpiece.

Whether or not the two-dimensional area 108 is generated at step 220, the pressing of the workpiece into a three-dimensional shape is modeled wherein the three-dimensional shape has at least one fixed dimension or other physical specification. As discussed above with respect to the processing of pork bellies, such fixed specification can be the width of the pressed three-dimensional shape. Next, at step 222, based on the results of the step of simulating pressing of the three-dimensional modeled work product, the pattern for the trimming of the work product to facilitate pressing of the work product into the desired three-dimensional shape is established. Then, at step 224, the work product is trimmed into the determined trimming pattern from step 222.

Figure 9:
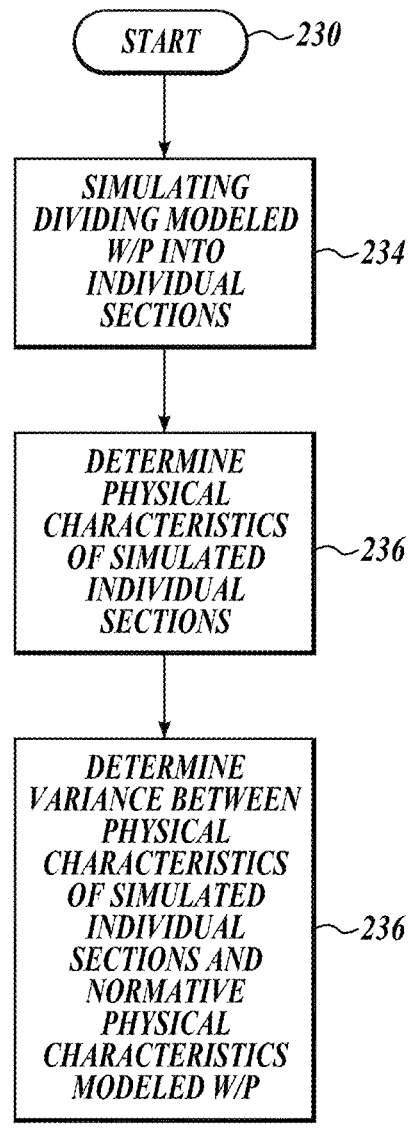
FIG. 9 is a flow diagram illustrating a process of one of the steps of the process of FIG. 8.

FIG. 9 sets forth an example of simulating the pressing of the three-dimensional model into the three-dimensional shape of step 220 in FIG. 8. The process starts at step 230 involving the simulating of the dividing of the modeled work product into individual sections, first step 232.

At step 234, one or more physical characteristics of the simulated individual section of the work product is ascertained.

Next, at step 236, determination is made of the variance between the one or more physical characteristics of the simulated individual section with the corresponding and the normative physical characteristics of the modeled work product. In other words, to what extent does the simulated individual section in which the modeled work product has been divided differ from the average or normative corresponding characteristic(s) of the modeled work product.

As discussed above, if for example the individual section of the work product is significantly thinner or thicker than the normative or average thickness of the modeled work product, then the pattern for trimming the work product can be adjusted so that a greater amount or letter amount of the work product can remain or be part of the work product when the work product is thereafter pressed into the desired three-dimensional shape.

As discussed above in FIG. 8, optionally the two-dimensional area 108 or 108A or 108B is mapped onto the top surface of the work product to represent the portion of the work product to be harvested. This process is depicted in FIG. 8, wherein at step 240 simulated end portions are cut from the mapped two-dimensional area of the work product and then each of the end portions is analyzed or evaluated based on desired physical characteristics or attributes of the end products. In the example of pork bellies, the simulated end portions may be bacon slices.

Numerous physical characteristics or attributes of the end portion or product can be evaluated using an optimization program. Such characteristics or attributes can include, for example, one or more of the thickness of the simulated final portion, the length of the simulated final portion, the height range of the simulated final portion along the length thereof, the heights at the ends of the final portion, the height variation or range along the length of the simulated final portion, the minimum height along the length of the simulated final portion, the flatness of the top and bottom surfaces of the simulated final portion, the extent of concavity of the top and bottom surfaces of the simulated final portion, the area of the concavity of the top/bottom surfaces of the final portion, the depth of the concavity of the top/bottom surface of the final portion, the aspect ratio of the concavity of the top/bottom surface of the simulated final portion, the taper of the height of the simulated final portion along the length thereof, the area of the simulated final portion which is defined by the length and height of the simulated final portion. Such height corresponds to the thickness of the three-dimensional workpiece WP.

Other characteristics or attributes include the range of the taper of the simulated final portion corresponding to the slope or taper of the top surface of the final portion. A further attribute or physical characteristic is the over edge area, which corresponds to a situation in which the modeled two-dimensional area extends beyond the perimeter of the workpiece. This is an undesired attribute or physical characteristic which is viewed as a reduction of the quality of the final portion. A further attribute or physical characteristic is the roughness or unevenness of the top and bottom surfaces of the final portion.

Another attribute or characteristic is the area of the mapped two-dimensional area on the workpiece relative to the total two-dimensional area of the workpiece. It is desirable to utilize as much of the total two-dimensional area of the workpiece as possible while maintaining a desired quality level, which is a measure of the extent to which each of the final portions achieve the set point or set point range established for each of the attributes or physical characteristics analyzed for each final portion.

In step 242, each of the simulated end pieces or slices can be analyzed. Alternatively, the simulated end pieces or slices can be analyzed at a selected frequency, for example, every other slice, every third slice, or other frequency of slices.

In step 244, the designated physical attributes or characteristics of the analyzed final portions is compared with a desired value, set point or range for each of the designated attributes or characteristics. This analysis is carried out for the analyzed simulated final portions from the workpiece. This analysis can be performed using an optimization function or program which determines the deviation from the desired or set point attributes or characteristics determined for the modeled final portions, step 246. This analysis for portions/slices is used to grade or rate the overall modeled portion of the workpiece, this is the portion of the workpiece to be harvested from the workpiece based on the mapped two-dimensional area of the workpiece, step 248. An overall rating or grade for the workpiece can be established and once such grade or rating is achieved, the iterative analysis process discussed above is terminated. However, if the set point or set point range for the overall grade or rating is not achieved, then in steps 250 and 252 a further iteration of the process beginning at step 240 is repeated.

As an alternative, at each iteration of the foregoing process, the overall rating or grade of the "harvested" workpiece is determined. As can be appreciated, as the two-dimensional area 108 or 108A or 108B of the workpiece increases, although the harvest quantity of the workpiece increases, at some point the quality of the final portions will decrease due to not meeting one or more of the designated physical attributes or characteristics of each of the final portions. For example, as the two-dimensional area expands it may reach the notch of the workpiece if the workpiece is a pork belly, or to the perimeter of the workpiece, which may be thinner or less uniform toward or adjacent the outer perimeter of the workpiece, as shown in FIGS. 5, 6, and 7.

Once the quality of the final portions decreases below an established limit or set point, then the iteration process is terminated and the area and location corresponding to the last acceptable iteration is used as the mapped area and location on the workpiece. The simulation of the pressing of the workpiece is then carried out as discussed above.

Figure 6:
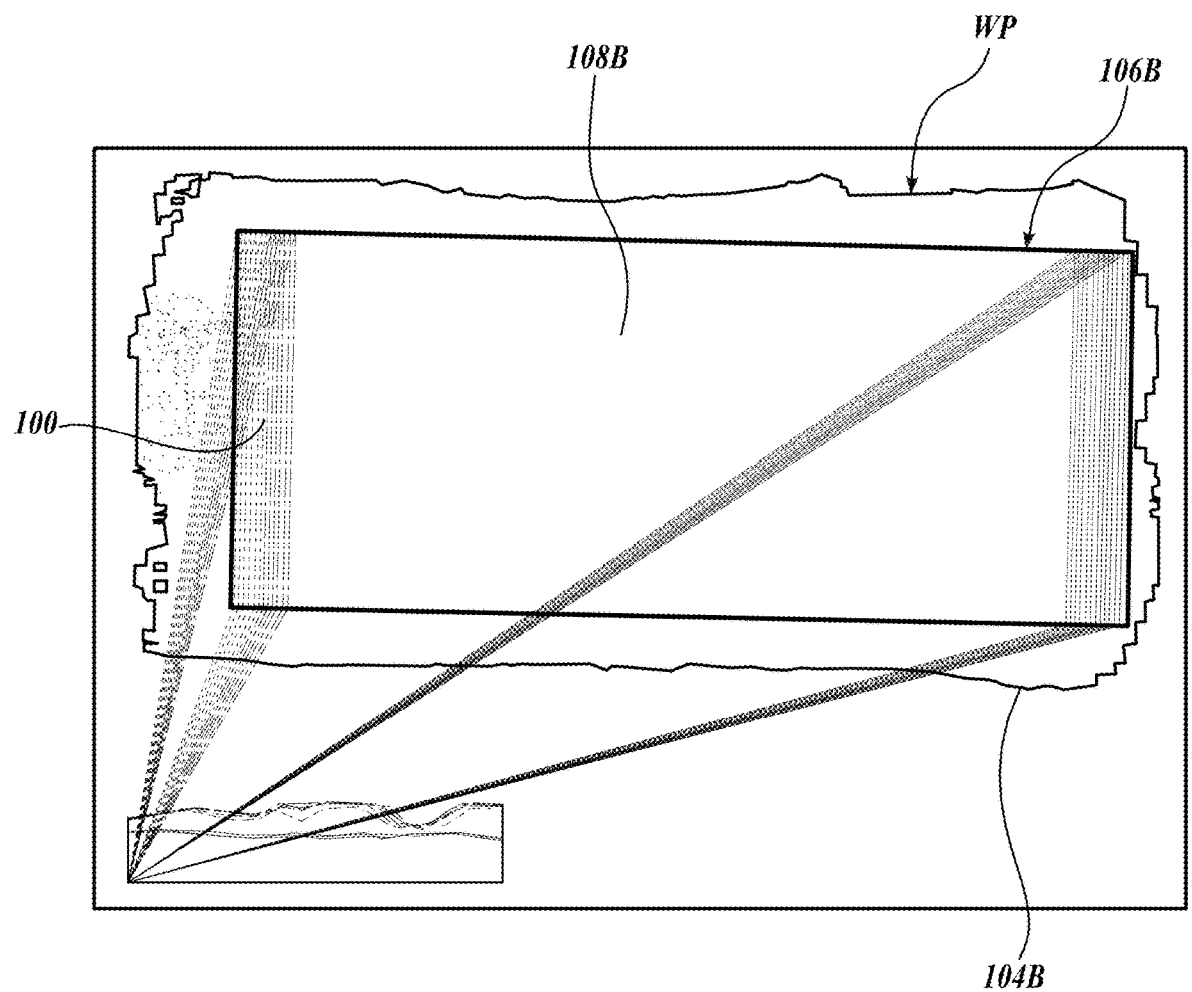
FIG. 6 is a schematic view showing a workpiece that may be trimmed and harvested using the system and method of the present disclosure.

FIGS. 4, 5, and 6 in the lower left-hand corner of the frame illustrate the upper contours of simulated slices cut from the workpiece. As illustrated, along portions of the margins of the workpiece the upper surfaces of the slices vary significantly in height or contour. (The height of a slice corresponds to the thickness of the workpiece.) Such variation typically is viewed as less desirable than if the upper surface were more uniform in height/contour.

As noted above, the optimizer iteratively alters the size and/or location of the two-dimensional area relative to the workpiece to seek an optimal two-dimensional harvest area on the workpiece. The optimizer is provided with 2 steps so that the change in the two-dimensional area is not necessarily uniform from each iteration to the next. Rather, with the 2 steps, the optimizer has a sense for how aggressively to change the two-dimensional area in size and location in the process of seeking an optimum solution. In this manner, the number of iterations necessary to reach the optimum solution is reduced.

The optimization process undertaken by the processor 80 can employ a value function (or its negative/opposite—a cost function) to rank each of the iterations of the potential two-dimensional areas of the work product to be harvested, as discussed above. In this regard, for the cut final portions or slices, each or selected designated physical attribute or characteristic is compared to an acceptable value range for such attribute or characteristic. For such attributes or characteristics, an acceptable value range is determined rather than just a single acceptable value. The cost function can be defined that has a value of 0 at the center of each range of each physical attribute or characteristic, with an increasing cost as the simulated values of the attribute or characteristic deviates from the center of the specified range.

Further, a weighing factor can be applied to the cost for the physical attributes or characteristics. Thereafter, the weighted costs of the designated attributes or characteristics are combined, such as by addition, to give a total cost. This analysis is carried out for the final portions simulated from the mapped selected area of the workpiece. As such, the total cost of the simulated final portions are combined to arrive at a total cost for the entire workpiece.

It will be understood that the term "cost" is used herein to refer to the negative or opposite of the term "value." It is possible to carry out the foregoing analysis from the viewpoint of the value achieved by the simulated final portions. Thus, the terms "cost" and "value" are related in a sense that, with respect to a particular physical attribute or characteristic, an increase in the "cost" corresponds to a decrease in the "value."

The cost function definition can take almost any form, including a "one-sided" definition where an attribute or characteristic can never be above or below a threshold, and the target (zero cost) value is something other than in the middle of a range. An example of this is that the end of the final portion should not extend beyond the edge of the actual workpiece.

Other cost functions that can be used, including:
1) the cost increases with deviation from the range midpoint, and continues increasing for characteristic values beyond the range;
2) the cost increases from a deviation from the range midpoint, with "hard" limits (for example, a large step-function increase) at the range limits;

3) there is no cost associated with values within the range, with "hard" limits at the range limits.

The "total cost" numbers can be analyzed using a multi-dimensional optimization technique, such as the "Gradient Descent" minimization algorithm, to expeditiously find an optimal size and location for the trimmed workpiece. Within a limited number of iterations of selected areas overlaid on the workpiece, it is possible to find an optimal solution without having to consider all of the perhaps thousands of potential sizes and positions of the area superimposed on the workpiece. Examples of non-linear algorithms similar to Gradient Descent include the Gauss-Newton method, the BFGS method, and the Levenberg-Marquardt method. Other algorithms or analysis methods may be utilized in this regard, including, for example, the Nieder-Mead method, differential evolution methods, genetic algorithms, and particle form optimization.

The method and system of the present disclosure may be operated with a plurality of optimization function analysis running at the same time on the same workpiece to simplify achieving the desired designated attributes and characteristics of the final portions harvested from the workpiece. For example, one analysis may be seeking to establish the size of the two-dimensional area corresponding to the workpiece to be harvested. A second analysis may be seeking to position the two-dimensional area longitudinally, laterally, and/or rotationally on the workpiece to optimize the harvest versus the value of the final portions harvested from the workpiece. These two analyses may be applied to the workpiece at the same time using different optimization functions.

While illustrative embodiments have been illustrated and described, it will be appreciated that various changes can be made therein without departing from the spirit and scope of the invention. For example, scanners or cutters of other types can be used in lieu of those described above.

As a further example, information regarding the physical information of the work product, for instance from the scanning data, together with the trimming pattern calculated for the work product, together with information pertaining to the pressing of the trimmed work product, including the results thereof, can be use in a feedback system to adjust or alter the determination of the trimming pattern to achieve a more desirable pressed work product. In the feedback system can adjust for various factors, for example the type of work product being processed, the physical condition of the work product (for example the temperature of the work product), the physical composition of the work product (for example the percent of fat or moisture in a meat or poultry work product), or other physical specifications of the work product. This feedback process could be use before a production run is initiated or during a production run if the quality of the pressed work products is deteriorating or otherwise changing.

The embodiments of the invention in which an exclusive property or privilege is claimed are defined as follows:

1. A method for trimming an irregularly shaped work product to be subsequently pressed into a three-dimensional shape having at least one specific physical specification, comprising:
    (a) scanning the irregularly shaped work product to obtain data regarding the physical characteristics of the work product;
    (b) generating a three-dimensional model of the scanned work product based on the scanning data;
    (c) simulating pressing the three-dimensional model of the scanned work product into the three-dimensional shape;
    (d) based on the results of the simulating step, determining a pattern for trimming the work product so that when pressed into the three-dimensional shape, the pressed work product is altered in shape to achieve the at least one specific physical specification; and
    (e) trimming the work product according to the determined trimming pattern.

2. The method of claim 1, wherein the at least one specific physical specification of the pressed three-dimensional shape includes one or more of the width, length, height, thickness, area, volume and flatness of the pressed three-dimensional shape.

3. The method of claim 1, wherein in trimming the work product in accordance with the determined trimming pattern, the pressed work product is facilitated into achieving the at least one specific physical specification.

4. The method of claim 1, wherein trimming the work product, so as to maintain the structural integrity of the work product when pressed.

5. The method of claim 1, wherein simulating the pressing of the modeled work product into the three-dimensional shape, comprising:
    (a) simulating dividing the modeled work product into individual sections;
    (b) measuring at least one physical characteristic of the simulated individual sections;
    (c) determining the variance of the measured at least one physical characteristic of the simulated individual sections from the normative corresponding physical characteristic(s) of the work product.

6. The method of claim 5, comprising determining for the simulated individual sections the variance of at least one of the height and volume of the simulated individual sections from the normative height and volume of the work product.

7. The method of claim 1, further comprising:
    (a) mapping an initial two-dimensional area on the modeled work product to be subsequently pressed into the three-dimensional shape;
    (b) simulating pressing the three-dimensional model of the scanned workpiece coinciding with the mapped two-dimensional area, into the three-dimensional shape; and
    (c) based on the results of the simulating step, determining a trimming pattern for the work product so that when pressed into the three-dimensional shape, the pressed work product achieves the at least one specific physical specification.

8. The method of claim 1, further comprising transmitting the trimming pattern to a pressing apparatus for pressing the work product into the three-dimensional shape.

9. A method of trimming an irregularly shaped work product to be subsequently pressed into a three-dimensional generally rectangular shape having at least one specific physical specification, comprising:
    (a) scanning the irregularly shaped work product to obtain data regarding the physical characteristics of the work product;
    (b) generating a three-dimensional model of the scanned work product;
    (c) analyzing the modeled work product in sections;
    (d) ascertaining at least one physical characteristic of the analyzed sections related to the ability of the work product to be pressed into the three-dimensional shape;

(e) determining the variance between the at least one physical characteristic of the analyzed section of the work product relative to the nominal corresponding physical characteristic(s) of the work product;

(f) based on the results from step (e), determining a trimming pattern for the work product so that when pressed into the three-dimensional shape, the work product achieves the at least one specific physical specification; and (g) trimming the work product according to the trimming pattern.

10. The method of claim 9, wherein the analyzed sections of the modeled work product comprise sections of the work product across the width of the work product, along the length of the work product, and/or along the height of the work product.

11. The method of claim 9, wherein the at least one specific physical characteristic of the analyzed sections of the work product including one or more of the width, length, thickness, height, area, volume and flatness of the sections.

12. The method of claim 9, wherein in trimming the work product in accordance with the determined trimming pattern, the pressed work product is facilitated into achieving the at least one specific physical specification.

13. The method of claim 9, wherein in trimming the work product, seeking to maintain the structural integrity of the work product when pressed.

14. A method for developing a pattern for trimming the longitudinal side edges of a pork belly and then trimming the longitudinal sides of the pork belly along the developed pattern prior to pressing the pork belly into a rectilinear volume of a desired width, wherein by trimming the longitudinal side edges of the pork belly along the developed trimming pattern structural damage to the pork belly during the subsequent pressing of the pork belly is sought to be minimized, comprising:

(a) scanning the pork belly to obtain data regarding the physical characteristics of the pork belly including the width distribution and volume distribution of the pork belly;

(b) generating a three-dimensional model of the pork belly;

(c) simulating slicing the modeled pork belly into virtual slices extending across the width of the pork belly;

(d) determining the height and volume of the simulated slices;

(e) determining for the simulated slices the variance from the average height and volume of the modeled pork belly;

(f) using the variance determinations to develop a trimming pattern for the longitudinal side edges of the pork belly so that upon pressing the pork belly into the rectilinear shape, the desired width of the pressed pork belly is achieved while seeking to maintain the structural integrity of the pork belly; and (g) trimming the pork belly along the developed trimming pattern.

15. The method of claim 14, wherein seeking to maintain the structural integrity of the pork belly comprises seeking to avoid fractures, cracks, splits, blowouts, and thin areas of the pressed pork belly.

16. The method of claim 14, further comprising:

(a) mapping an initial two-dimensional area on the pork belly to select a portion of the pork belly to be harvested from the pork belly based on the three-dimensional model of the pork belly; and (b) simulating slicing the pork belly corresponding to the mapped two-dimensional area of the pork belly.

17. The method of claim 14, in mapping an initial two-dimensional area to select a portion of the pork belly to be harvested:

determining for each of the simulated slices the variance for desired physical attributes of the slices;

rating the overall selected portion of the pork belly corresponding to the mapped two-dimensional area and location based on the extent to which of the simulated slices possesses the desired physical attributes of the slices until an optimum two-dimensional area and location on the workpiece is obtained.

18. The method of claim 14, further comprising:

determining at least one of the height distribution and volume distribution of the simulated slices; and comparing the at least one of height distribution and volume distribution with the average height and volume of the modeled pork belly;

based on the variance of the at least one height distribution and volume distribution of the simulated slice from the average height or volume of the modeled pork belly, developing a pattern for trimming the pork belly.

19. The method of claim 14, wherein the pattern for trimming of the pork belly along the side edges of the pork belly comprising nonlinear trimming paths, thereby widening or narrowing the width of the pork belly based on the physical characteristics of the pork belly.

* * * * *